United States Patent
Sugiyama

(10) Patent No.: US 9,446,696 B2
(45) Date of Patent: Sep. 20, 2016

(54) VEHICLE SEAT

(71) Applicant: TS TECH CO., LTD., Asaka-shi, Saitama (JP)

(72) Inventor: Shinji Sugiyama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 14/430,770

(22) PCT Filed: Sep. 26, 2012

(86) PCT No.: PCT/JP2012/074799
§ 371 (c)(1),
(2) Date: Mar. 24, 2015

(87) PCT Pub. No.: WO2014/049755
PCT Pub. Date: Apr. 3, 2014

(65) Prior Publication Data
US 2015/0239380 A1    Aug. 27, 2015

(51) Int. Cl.
*B60N 2/68*    (2006.01)
*B60N 2/64*    (2006.01)
*B60N 2/70*    (2006.01)
*B60N 2/42*    (2006.01)
*B60N 2/62*    (2006.01)

(52) U.S. Cl.
CPC .............. *B60N 2/68* (2013.01); *B60N 2/4263* (2013.01); *B60N 2/62* (2013.01); *B60N 2/64* (2013.01); *B60N 2/646* (2013.01); *B60N 2/686* (2013.01); *B60N 2/7094* (2013.01)

(58) Field of Classification Search
CPC ...... B60N 2/68; B60N 2/686; B60N 2/7064; B60N 2/7094

USPC ........... 297/452.18, 452.52, 452.56, 284.11, 297/452.49, 452.53, 452.55, 452.57, 297/216.1–216.2
See application file for complete search history.

(56) References Cited

U.S. PATENT DOCUMENTS 2,241,909 A * 5/1941 Hoven ............... A47C 7/30
                                              297/452.52 X
3,034,829 A * 5/1962 Flint ................ A47C 7/30
                                              297/452.52 X (Continued)

FOREIGN PATENT DOCUMENTS

JP    59-223527 A    12/1984
JP    61-207260 U    12/1986

(Continued)

OTHER PUBLICATIONS

Extended European Search Report issued for EP 12885840.4 (Jul. 24, 2015).

*Primary Examiner* — Rodney B White
(74) *Attorney, Agent, or Firm* — Drinker Biddle & Reath LLP

(57) ABSTRACT

Provided is a vehicle seat that improves a sitting feeling while having a high followability with respect to an occupant sitting on the seat. A seat cushion of a vehicle seat includes right and left side frames, a pan frame connecting the front portions of the side frames to each other, and an occupant support member connecting the side frames to each other at the rear side of the pan frame. The front end of the occupant support member inclined backward is disposed higher at the upper position than the rear end of the pan frame. A thigh support portion at the center of the pan frame extends toward the occupant support member more than both right and left ends.

7 Claims, 6 Drawing Sheets

(56) References Cited

U.S. PATENT DOCUMENTS

| | | | | |
|---|---|---|---|---|
| 3,810,675 | A * | 5/1974 | Ferrara | B60N 2/686 297/452.18 |
| 4,147,336 | A * | 4/1979 | Yamawaki | B60N 2/7041 297/452.52 X |
| 4,357,005 | A * | 11/1982 | Bourke | B60N 2/7094 267/142 |
| 4,492,408 | A * | 1/1985 | Lohr | B60N 2/00 248/424 |
| 4,702,522 | A * | 10/1987 | Vail | A47C 7/18 297/284.2 |
| 5,088,793 | A * | 2/1992 | Mithuhiro | A47C 7/025 297/452.52 |
| 5,328,248 | A * | 7/1994 | Nishiyama | B60N 2/071 297/452.18 |
| 5,542,747 | A * | 8/1996 | Burchi | B29C 44/08 297/452.55 |
| 5,857,750 | A * | 1/1999 | Kashiwamura | A47C 7/14 248/608 |
| 6,450,573 | B1 * | 9/2002 | Yamaguchi | B60N 2/4221 297/216.1 |
| 6,557,935 | B2 * | 5/2003 | Choi | B60N 2/4221 297/216.1 |
| 6,648,409 | B1 * | 11/2003 | Laporte | B60N 2/42718 297/216.1 |
| 6,746,077 | B2 * | 6/2004 | Klukowski | B60N 2/42763 297/216.1 |
| 7,192,087 | B2 * | 3/2007 | Adragna | B60N 2/62 297/216.1 |
| 8,240,758 | B2 * | 8/2012 | Combest | B60N 2/4221 297/216.1 |
| 8,272,687 | B2 * | 9/2012 | Gross | B60N 2/4221 297/216.1 |
| 8,308,235 | B2 * | 11/2012 | Ellison | B60N 2/7005 297/216.1 |
| 8,398,166 | B2 * | 3/2013 | Lindsay | B29C 44/0461 297/216.1 |
| 8,408,655 | B2 * | 4/2013 | Ellison | B60N 2/015 297/216.1 |
| 8,439,440 | B2 * | 5/2013 | Ellison | B29C 44/0461 297/216.1 |
| 8,506,016 | B2 * | 8/2013 | Mizobata | B60N 2/682 297/452.18 |
| 8,662,483 | B2 * | 3/2014 | Yamaguchi | B60N 2/002 267/102 |
| 8,684,459 | B2 * | 4/2014 | Teufel | B60N 2/0232 297/284.11 |
| 8,746,792 | B2 * | 6/2014 | Ruthinowski | B60N 2/4263 297/216.1 |
| 2004/0189078 | A1 * | 9/2004 | Andersson | B60N 2/502 297/452.49 |
| 2007/0040440 | A1 * | 2/2007 | Kircher | B60N 2/449 297/452.55 |
| 2009/0309397 | A1 * | 12/2009 | Gross | B60N 2/4221 297/216.1 |
| 2010/0001560 | A1 * | 1/2010 | Gross | B60N 2/42763 297/216.1 |
| 2010/0060045 | A1 * | 3/2010 | Gross | B60N 2/4221 297/216.1 |
| 2012/0098305 | A1 | 4/2012 | Yamaki et al. | |
| 2013/0009442 | A1 * | 1/2013 | Burnham | B60N 2/68 297/452.18 |
| 2014/0021769 | A1 | 1/2014 | Sugiyama | |
| 2015/0231993 | A1 * | 8/2015 | Hoshi | B60N 2/1615 297/344.12 |
| 2016/0016492 | A1 * | 1/2016 | Subramanian | B60N 2/4221 297/216.1 |

FOREIGN PATENT DOCUMENTS

| | | | |
|---|---|---|---|
| JP | 06098817 A * | 4/1994 | |
| JP | 09-117346 A | 5/1997 | |
| JP | 2007-099195 A | 4/2007 | |
| WO | WO 2011/001622 A1 | 1/2011 | |
| WO | WO 2012/133675 A1 | 10/2012 | |
| WO | WO 2014024936 A1 * | 2/2014 | B60N 2/48 |
| WO | WO 2014167639 A1 * | 10/2014 | B60N 2/682 |

* cited by examiner

VEHICLE SEAT

This application is a National Stage Entry application of PCT Application No. PCT/JP2012/074799, filed Sep. 26, 2012.

BACKGROUND

Disclosed herein is a vehicle seat, and particularly, a vehicle seat that gives an excellent sitting feeling to an occupant while following the body shape of the occupant.

Generally, in a vehicle seat, a seat cushion that supports buttocks and thighs of an occupant is formed in a manner such that a cushion pad is placed on a cushion frame and is covered by an outermost cover. Then, in such a seat cushion, various techniques have been proposed in order to give a satisfactory feeling to the occupant.

As a technique of obtaining a satisfactory feeling in the seat cushion, for example, a technique of reducing a vibration transmitted from a vehicle body is known (for example, see Japanese Patent Document No. 9-117346 A ("the '346 Document")).

A seat cushion disclosed in the '346 Document includes a substantially rectangular plate-shaped pan frame which serves as a framework and a plurality of elastic springs which connect the rear portion of the pan frame in the right and left direction.

The front portion of the pan frame is formed in a flat plate shape at a position where the thighs of the occupant sitting on the seat are supported, and the rear portion thereof is provided with a concave portion which is recessed downward at a position where the buttocks of the occupant are supported. The elastic springs are disposed above the concave portion supporting the buttocks of the occupant, and are disposed at the height of the horizontal plane substantially the same as the front portion of the pan frame.

Accordingly, the seat cushion may obtain a satisfactory cushioning performance by the elastic deformation of the elastic spring and the cushion pad, and may reduce a vibration transmitted from the vehicle body generated when the vehicle travels.

However, in the seat cushion of the '346 Document, the front portion of the pan frame and the elastic spring are located at the height of the same horizontal plane. For this reason, when the occupant sits on the seat, the elastic spring sinks down more largely than the front portion of the plate-shaped pan frame, and hence there is a concern that the occupant sitting on the seat may feel uncomfortable. For that reason, there has been a desire for a seat cushion that further improves a sitting feeling while keeping a high followability of the elastic spring with respect to the occupant sitting on the seat.

At the same time, there has been a desire for a vehicle seat that further decreases the weight and the size thereof in consideration of the arrangement of the pan frame and the elastic spring.

SUMMARY

Various embodiments of the invention are made in consideration of the above-described problem, and an object of them is to provide a vehicle seat that further improves a sitting feeling while having a high followability with respect to the occupant sitting on the seat.

Further, another object is to provide a vehicle seat that has a satisfactory sitting feeling by decreasing the weight and the size thereof.

The above-described problem is solved by a vehicle seat according to various embodiments of the invention. The vehicle seat includes: a seat cushion which includes a cushion frame as a framework, wherein the cushion frame includes right and left side frames, a pan frame connecting the front portions of the side frames to each other, and an occupant support member connecting the side frames at the rear side of the pan frame, wherein the occupant support member is disposed to be inclined backward with respect to the horizontal plane, wherein the front end of the occupant support member is provided at a higher position than a rear end of the pan frame, wherein the center portion of the pan frame in the right and left direction is provided with thigh support portions supporting thighs of the occupant sitting on the seat, and wherein the thigh support portions extend toward the occupant support member more than both right and left ends of the pan frame in the front to back direction.

In this way, since the occupant support member is disposed to be inclined backward with respect to the horizontal plane and the front end of the occupant support member is provided at the upper position than the rear end of the pan frame, the high followability with respect to the buttocks of the occupant may be ensured by the biasing force of the occupant support member that is inclined backward when the occupant sits on the seat, and the deviation of the pan frame and the occupant support member in the up and down direction when the occupant sits on the seat may be suppressed in consideration of the sinking amount of the occupant support member in the up and down direction. Thus, it is possible to provide the vehicle seat that improves the sitting feeling.

Further, since the center portion of the pan frame in the right and left direction is provided with the thigh support portions that support the thighs of the occupant sitting on the seat and the thigh support portions extend toward the occupant support member more than both right and left ends of the pan frame in the front to back direction, the thigh support portions of the pan frame support the thighs of the occupant and the occupant support member supports the buttocks of the occupant when the occupant sits on the seat. Further, the distance between the thigh support portion and the occupant support member in the front to back direction is shortened. Accordingly, a stress of a sitting load is distributed to the pan frame and the occupant support member while the stress is not intensively applied to the occupant support member, and hence the sitting feeling may be further improved.

It is preferable that the occupant support member be a first occupant support member that is disposed near the pan frame in the front to back direction, it is preferable that the cushion frame include a second occupant support member that connects the side frames to each other and is disposed behind the first occupant support member, and it is preferable that the first occupant support member be formed so that a bending amount in the up and down direction with respect to a load generated when the occupant sits on the seat is smaller than that of the second occupant support member.

In this way, since the first occupant support member is formed so that the bending amount in the up and down direction with respect to the load generated when the occupant sits on the seat is smaller than that of the second occupant support member, the second occupant support member having a large bending amount is disposed at the rear side of the cushion frame to which a large amount of the sitting load generated by the buttocks of the occupant is applied when the occupant sits on the seat, and hence the followability with respect to the occupant sitting on the seat is high. Thus, the sitting feeling may be further improved.

It is preferable that the first occupant support member and the second occupant support member be formed in a corrugated shape to be curved at a predetermined pitch in the front to back direction, and it is preferable that the pitch of the first occupant support member be larger than that of the second occupant support member.

In this way, since the pitch of the first occupant support member is larger than that of the second occupant support member, the bending amount of the first occupant support member in the up and down direction becomes smaller than that of the second occupant support member. Accordingly, the first occupant support member having a small bending amount is disposed at the substantial center portion of the cushion frame to which a small amount of the sitting load generated by the buttocks of the occupant is applied. Thus, the sitting feeling may be further improved.

It is preferable that the first occupant support member and the second occupant support member be formed as an elastic spring, and it is preferable that the diameter of the first occupant support member be large in the first occupant support member and the second occupant support member.

In this way, since the diameter of the first occupant support member is large, the bending amount of the first occupant support member in the up and down direction becomes the smallest. Accordingly, the first occupant support member having the smallest bending amount is disposed at the substantial center portion of the cushion frame to which a small amount of the sitting load generated by the buttocks of the occupant is applied. Thus, the sitting feeling may be further improved.

It is preferable that the rear end extending toward the occupant support member in the thigh support portion be provided with a flange protruding downward from the rear end.

In this way, since the rear end of the thigh support member is provided with the flange that protrudes downward, the rigidity of the rear end of the thigh support portion may be improved while keeping the sitting feeling of the occupant. Further, since the flange protrudes downward, the interference with the occupant support member bent in the up and down direction may be suppressed.

It is preferable that a concave portion which is recessed downward be formed between the thigh support portions in the right and left direction.

With such a configuration, the impact applied to the groin of the occupant may be reduced when the occupant sits on the seat, and hence the sitting feeling may be further improved.

It is preferable that the cushion frame include a frame connection member that connects the rear portions of the right and left side frames, and it is preferable that the first occupant support member and the second occupant support member be provided at the upper position than the upper surface of the frame connection member.

In this way, since the first occupant support member and the second occupant support member are provided at a higher position than the upper surface of the frame connection member, the occupant support members are disposed near the buttocks of the occupant sitting on the seat in the up and down direction, and hence the followability with respect to the occupant may be further improved.

Further, since the thickness of the cushion pad provided above the occupant support member is thinned, the seat may be decreased in weight and size.

It is preferable that the front end of the first occupant support member and the rear end of the second occupant support member be provided at a higher position than a plane formed by the rear end of the pan frame and the upper surface of the frame connection member.

With such a configuration, the occupant support member is disposed near the buttocks of the occupant sitting on the seat in the up and down direction, and hence the followability with respect to the occupant may be improved. Further, the seat is decreased in weight and size.

According to an embodiment, since the occupant support member is disposed to be inclined backward with respect to the horizontal plane and the front end of the occupant support member is provided at a higher position than the rear end of the pan frame, the high followability with respect to the buttocks of the occupant may be ensured by the biasing force of the occupant support member that is inclined backward when the occupant sits on the seat, and the deviation of the pan frame and the occupant support member in the up and down direction when the occupant sits on the seat may be suppressed in consideration of the sinking amount of the occupant support member in the up and down direction. Thus, it is possible to provide the vehicle seat that improves the sitting feeling.

Further, since the center portion of the pan frame in the right and left direction is provided with the thigh support portions that support the thighs of the occupant sitting on the seat and the thigh support portions extend toward the occupant support member more than both right and left ends of the pan frame in the front to back direction, the thigh support portions of the pan frame support the thighs of the occupant and the occupant support member supports the buttocks of the occupant when the occupant sits on the seat. Further, the distance between the thigh support portion and the occupant support member in the front to back direction is shortened. Accordingly, a stress of a sitting load is distributed to the pan frame and the occupant support member while the stress is not intensively applied to the occupant support member, and hence the sitting feeling may be further improved.

According to an embodiment, since the first occupant support member is formed so that the bending amount in the up and down direction with respect to the load generated when the occupant sits on the seat is smaller than that of the second occupant support member, the second occupant support member having a large bending amount is disposed at the rear side of the cushion frame to which a large amount of the sitting load generated by the buttocks of the occupant is applied when the occupant sits on the seat, and hence the followability with respect to the occupant sitting on the seat is high. Thus, the sitting feeling may be further improved.

According to an embodiment, since the pitch of the first occupant support member is larger than that of the second occupant support member, the bending amount of the first occupant support member in the up and down direction becomes smaller than that of the second occupant support member. Accordingly, the first occupant support member having a small bending amount is disposed at the substantial center portion of the cushion frame to which a small amount of the sitting load generated by the buttocks of the occupant is applied. Thus, the sitting feeling may be further improved.

According to an embodiment, since the diameter of the first occupant support member is large, the bending amount of the first occupant support member in the up and down direction with respect to the sitting load generated by the occupant becomes the smallest. Accordingly, the first occupant support member having the smallest bending amount is disposed at the substantial center portion of the cushion frame to which a small amount of the sitting load generated by the buttocks of the occupant is applied. Thus, the sitting feeling may be further improved.

According to an embodiment, since the rear end of the thigh support member is provided with the flange that protrudes downward, the rigidity of the rear end of the thigh support portion may be improved while keeping the sitting feeling of the occupant. Further, since the flange protrudes downward, the interference with the occupant support member bent in the up and down direction may be suppressed.

According to an embodiment, the impact applied to the groin of the occupant may be reduced when the occupant sits on the seat, and hence the sitting feeling may be further improved.

According to an embodiment, since the first occupant support member and the second occupant support member are provided at a higher position than the upper surface of the connection member, the occupant support members are disposed near the buttocks of the occupant sitting on the seat in the up and down direction, and hence the followability with respect to the occupant may be further improved.

Further, since the thickness of the cushion pad provided above the occupant support member is thinned, the seat may be decreased in weight and size.

According to an embodiment, the occupant support member is disposed near the buttocks of the occupant sitting on the seat in the up and down direction, and hence the followability with respect to the occupant may be improved. Further, the seat is decreased in weight and size.

DETAILED DESCRIPTION

Hereinafter, embodiments of the invention will be described with reference to the drawings. Furthermore, the members and the arrangement to be described below do not limit the invention, and may be modified into various forms according to the spirit of the invention.

The embodiment relates to a vehicle seat including a pan frame that supports thighs of an occupant and an occupant support member that supports buttocks thereof. Here, the front end of the occupant support member inclined backward is disposed at the upper position than the rear end of the pan frame, and the distance between the occupant support member and the pan frame in the front to back direction is short.

Figure 1:
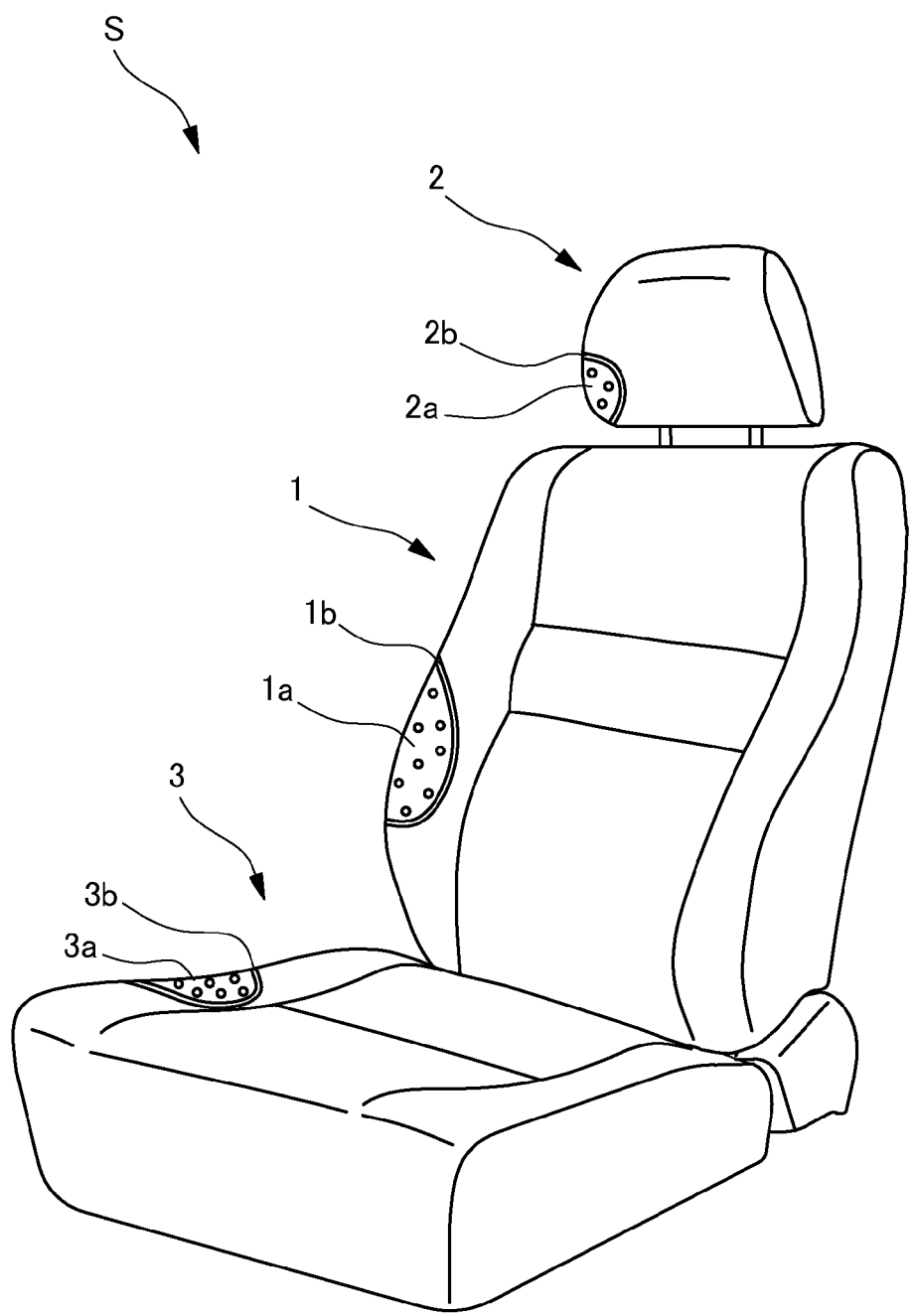
FIG. 1 is a schematic perspective view of a vehicle seat according to an embodiment of the invention.

As shown in FIG. 1, a vehicle seat S of the embodiment mainly includes a seat back 1, a headrest 2 which is disposed at the upper surface side of the seat back 1, and a seat cushion 3 which is disposed at the front side of the seat back 1.

Furthermore, in the seat back 1 of the vehicle seat S, the occupant sitting side becomes the front side.

The seat back 1 is a back portion that supports the back of the occupant from the rear side, and is formed in a manner such that a cushion pad 1a is placed on a seat back frame (not shown) as a framework and is covered by an outermost cover 1b.

The headrest 2 is a head portion that supports the head of the occupant from the rear side, and is formed in a manner such that a cushion pad 2a is placed on a pillar (not shown) as a core and is covered by an outermost cover 2b.

Figure 2:
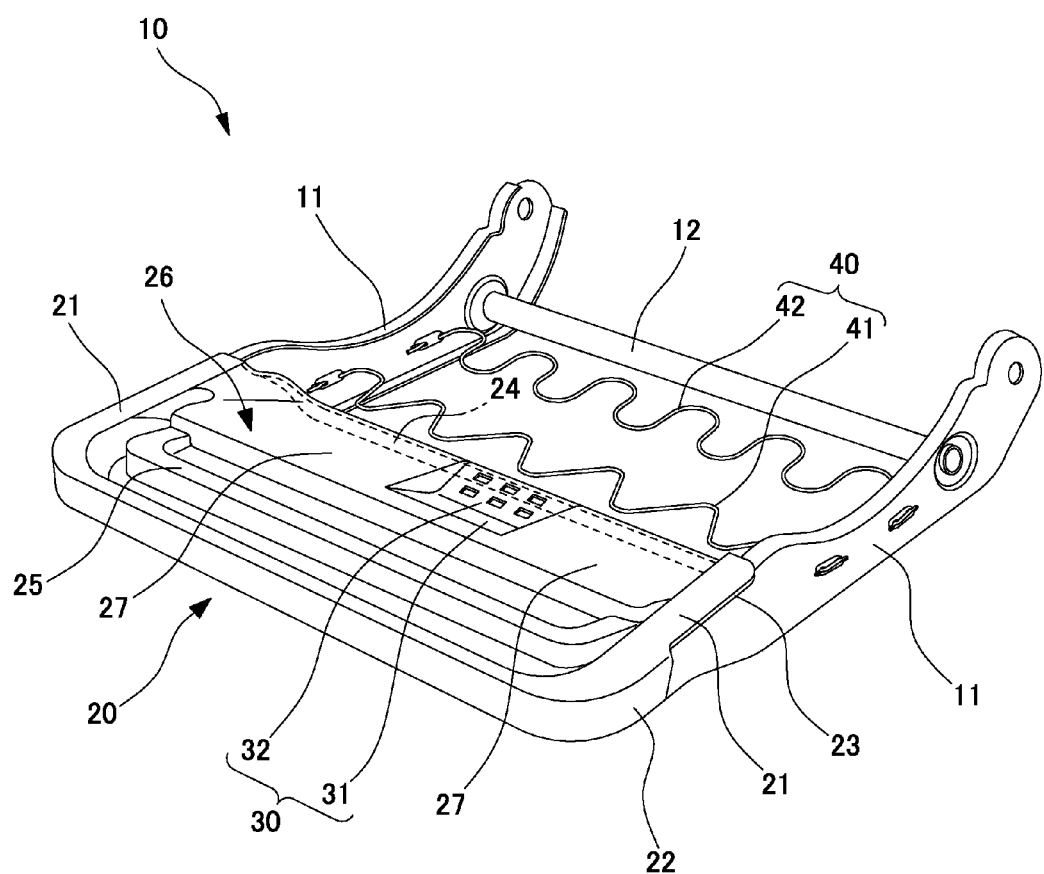
FIG. 2 is a schematic perspective view of a cushion frame according to the embodiment.

The seat cushion 3 is a seat portion that supports the occupant from the downside, and is formed in a manner such that a cushion pad 3a is placed on a cushion frame 10 as a framework shown in FIG. 2 and is covered by an outermost cover 3b from the upside of the cushion pad.

The cushion frame 10 is substantially formed as a rectangular frame as a framework of the seat cushion 3, and mainly includes right and left side frames 11 that are disposed at both right and left ends, a frame connection member 12 that is provided between the rear portions of each side frame 11, a plate-shaped pan frame 20 which is provided between the upper surfaces of the front portions of each side frame 11, and an occupant support member 40 that connects the substantial center portions of each side frame 11 in the front to back direction as shown in FIG. 2.

The side frame 11 is formed as a sheet metal member that extends in the front to back direction, and the left side frame 11 and the right side frame 11 are separated from each other in the right and left direction while being disposed in parallel.

The frame connection member 12 that extends in the right and left direction is connected and fixed to the right and left inner surfaces of the rear portions of the side frames 11.

The frame connection member 12 is formed as a pipe member that substantially has a circular shape in the vertical sectional view, is disposed at the rear side of the occupant support member 40, and penetrates the substantial center portions of the right and left side frames 11 in the up and down direction.

The pan frame 20 is formed as a substantially rectangular metallic frame that supports the thighs of the occupant, and is formed so that the upper surface thereof is substantially flat.

Each of both right and left ends 21 of the pan frame 20 includes a bent portion 22 which is bent downward at the front portion and a side flange portion 23 which protrudes downward at the portion from the substantial center portion to the rear portion.

The bent portion 22 is latched to the upper surface of the front portion of each side frame 11, and is fixedly bonded thereto in a connected state.

The rear end of the pan frame 20 includes a rear flange portion 24 which protrudes downward from the rear end in the right and left direction.

The rear flange portion 24 is formed by extending a portion between both right and left ends 21 in the right and left direction.

Furthermore, the front end of the rear flange portion 24 of the embodiment protrudes downward, but the invention is not limited thereto. For example, the rear flange portion may be bent forward. In this configuration, the rigidity of the rear end of the pan frame 20 may be improved, and the rear flange portion is disposed while suppressing the interference with the occupant support member 40.

The center portion of the pan frame 20 in the right and left direction includes a convex portion 25 which protrudes upward at the front portion and an inclined portion 26 which is inclined downward from the substantial center portion toward the rear portion.

The convex portion 25 is substantially formed in a U-shape, and extends in the right and left direction. In this way, since the front portion of the pan frame 20 is provided with the convex portion 25, it is possible to suppress a submarine/sinking phenomenon in the event of the vehicle collision, and to improve the sitting feeling by suppressing a positional deviation when the occupant sits on the seat.

Figure 3:
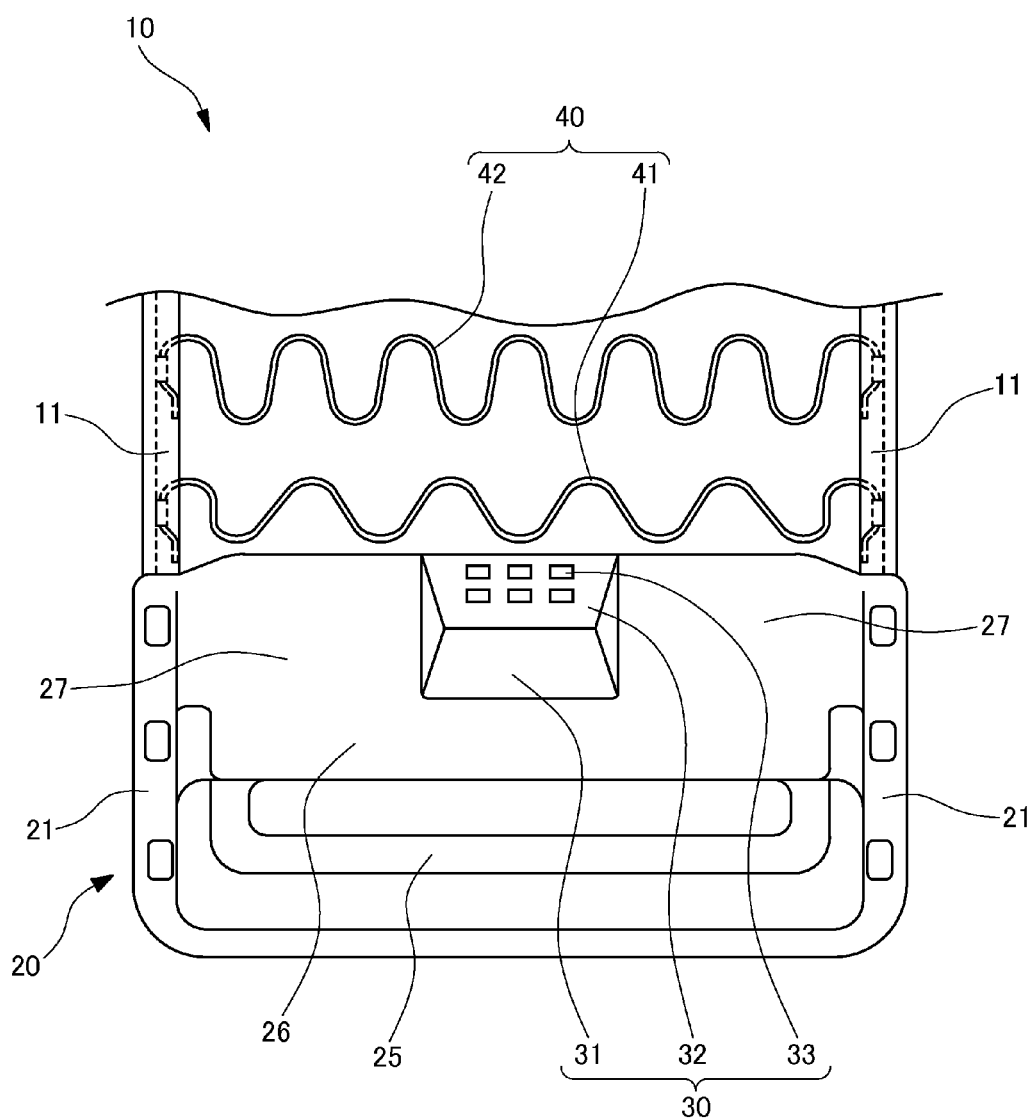
FIG. 3 is a schematic plan view of the cushion frame according to the embodiment.

The inclined portion 26 is substantially formed in a rectangular shape, and extends backward more than both right and left ends 21 in the pan frame 20 as shown in FIG. 3. Specifically, the rear end of the inclined portion 26 extends backward to be inclined toward the center side from the right and left sides.

The inclined portion 26 includes a pair of thigh support portions 27 which supports the right and left thighs of the occupant sitting on the seat and a concave portion 30 which is recessed downward between the right and left thigh support portions 27.

As shown in FIG. 2, the thigh support portion 27 is substantially formed in a rectangular shape of which the upper surface is flat, and is disposed to be inclined backward with respect to the horizontal plane.

As shown in FIG. 3, since the thigh support portion 27 is formed to extend backward more than both right and left ends 21, the distance between the thigh support portion 27 and the occupant support member 40 in the front to back direction is shortened. For that reason, since a stress of a sitting load is distributed to the pan frame 20 and the occupant support member 40 while the stress is not intensively applied to the occupant support member 40, the sitting feeling may be further improved.

The concave portion 30 is substantially formed in a rectangular shape, is disposed at a position corresponding to the groin of the occupant sitting on the seat, and is formed to extend in the front to back direction.

The concave portion 30 includes an inclined portion 31 and a bottom surface portion 32 which is continuous to the rear side of the inclined portion 31. The inclined portion 31 extends from the front side to the rear side to be inclined downward more than the thigh support portion 27, and the bottom surface portion 32 is formed as a horizontal plane.

The bottom surface portion 32 is provided with substantially rectangular holes 33 that penetrate the bottom surface portion in the up and down direction, and each hole 33 is formed as a hole to which the other member such as a harness is attached.

Furthermore, the body shape of the hole 33 is not limited to the substantially rectangular shape, and may be appropriately modified into various shapes. Further, the hole 33 may be provided only at one position.

The concave portion 30 of the embodiment includes the inclined portion 31 and the bottom surface portion 32, but the invention is not limited thereto. For example, the concave portion may be appropriately modified into various forms as long as the impact applied to the thighs of the occupant sitting on the seat may be reduced.

For example, the concave portion 30 may be substantially recessed in a rectangular shape so that the entire part thereof becomes a horizontal plane, and a portion which is continuous between the concave portion 30 and each of the right and left thigh support portions 27 may be chamfered.

Further, a connection portion which connects the right and left thigh support portions 27 may be separately provided over the concave portion 30. When the connection portion is provided separately, the rigidity of the rear end of the pan frame 20 may be improved.

Figure 4:
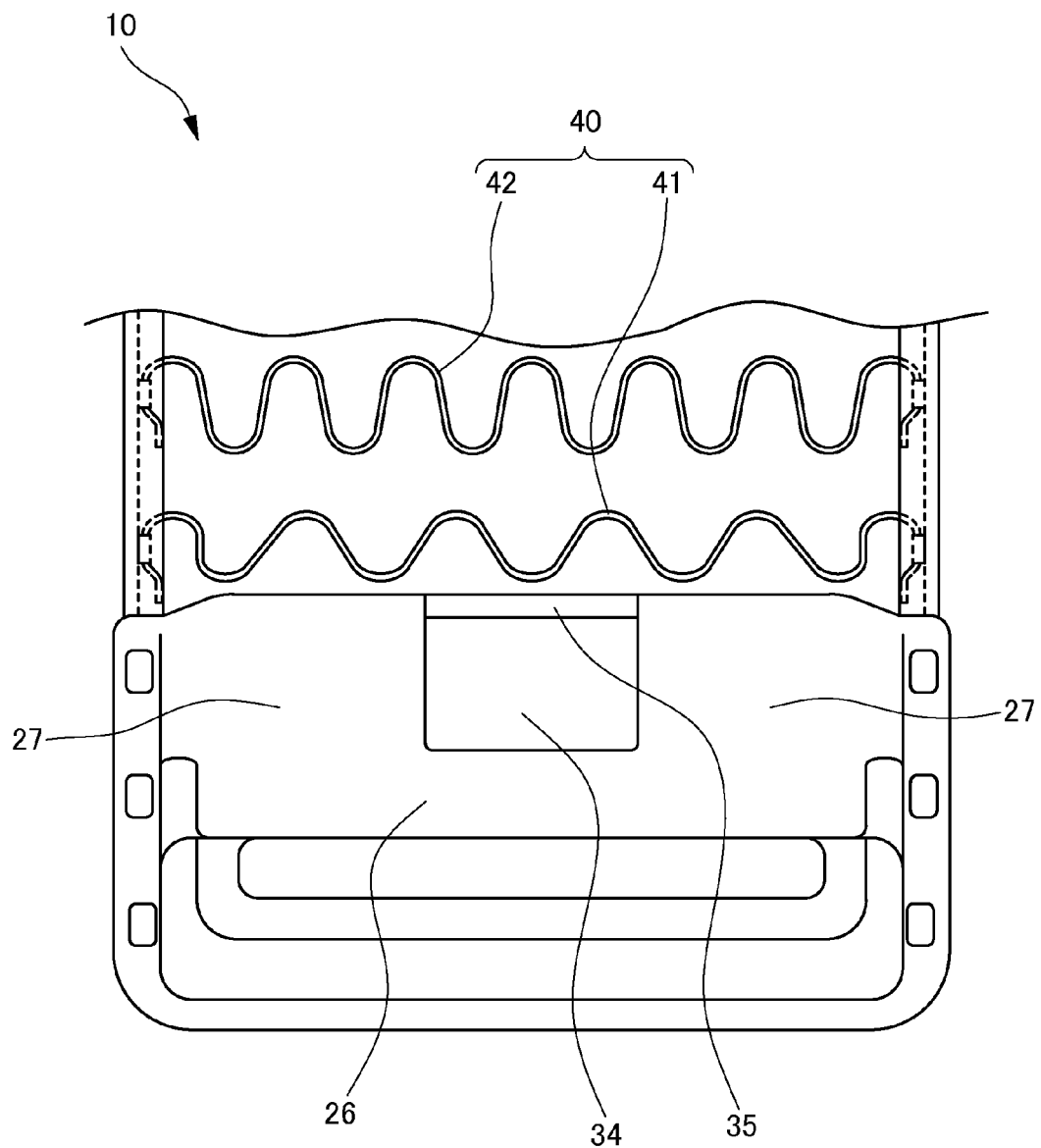
FIG. 4 is a schematic plan view of a cushion frame according to a second embodiment of the invention.

As the other embodiment, as shown in FIG. 4, the inclined portion 26 may include a substantially rectangular hole portion 34 which is provided between the right and left thigh support portions 27 to penetrate the thigh support portions in the up and down direction and a connection portion 35 which connects the rear ends of the right and left thigh support portions 27.

The hole portion 34 is substantially formed in a rectangular shape, but the invention is not limited thereto. For example, the hole portion may be formed in a circular shape, an oval shape, or a polygonal shape.

When the hole portion 34 is provided between the right and left thigh support portions 27, the impact applied to the groin of the occupant sitting on the seat may be further reduced, and the weight of the pan frame 20 may be decreased.

The connection portion 35 extends in the right and left direction, and is bonded to the rear ends of the thigh support portions 27. Thus, the connection portion is used as a member that reinforces the thigh support portions 27.

The connection portion 35 is provided with a flange portion (not shown) which protrudes downward, and is disposed to suppress the interference with the occupant support member 40 while improving the rigidity.

Furthermore, the connection portion 35 of the embodiment is provided at one position, but may be provided at a plurality of positions.

Figure 5:
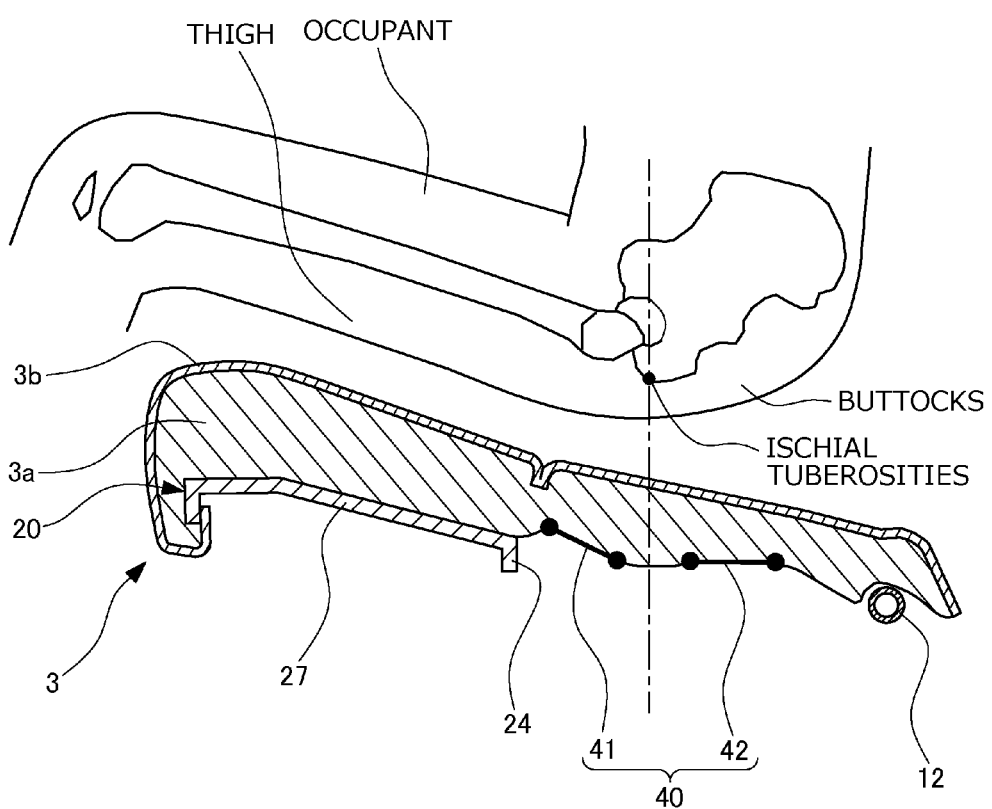
FIG. 5 is a side-view diagram illustrating a position where an occupant sits on a seat cushion according to the embodiments.

As shown in FIG. 5, the occupant support member 40 is an elastic spring that supports the buttocks of the occupant sitting on the seat with the cushion pad 3*a* interposed therebetween, and is formed as a corrugated wire member called an S-spring or a zigzag spring.

As shown in FIG. 2, a plurality of the occupant support members 40 are disposed between the pan frame 20 and the frame connection member 12 at a predetermined interval, and extend to be substantially parallel to one another in the right and left direction.

Further, the occupant support member 40 is formed to be curved at a predetermined pitch in the front to back direction.

Furthermore, the occupant support member 40 of the embodiment is formed as the elastic spring, but the invention is not limited thereto. For example, an elastic body such as elastic rubber may be used instead.

The occupant support member 40 includes a first occupant support member 41 that is disposed near the pan frame 20 in the front to back direction and a second occupant support member 42 that is disposed behind the first occupant support member 41.

The occupant support member 40 is connected to the right and left side frames 11 in a manner such that both right and left ends thereof are latched to the inner surfaces of the right and left side frames 11.

Specifically, a concave portion which is recessed inward in the right and left direction is formed at each of the inner surfaces of the right and left side frames 11, and each concave portion is provided with a penetration hole formed in the front to back direction. The occupant support member 40 is connected in a manner such that both right and left ends thereof are inserted and latched into the penetration hole.

As shown in FIG. 3, both right and left ends of the first occupant support member 41 are connected to the side frames 11, and are located on the extension line obtained by extending the rear ends of the thigh support portion 27 and the concave portion 30 outward in the right and left direction.

As shown in FIG. 3, the thigh support portion 27 and the concave portion 30 of the pan frame 20 extend backward more than the portions in which the side frames 11 are wrapped by both right and left ends 21.

For that reason, a portion which is connected to the side frame 11 in the first occupant support member 41 may be disposed near the pan frame 20.

In other words, the pan frame 20 may be disposed near the first occupant support member 41 to avoid the portion which is connected to the side frame 11 in the first occupant support member 41.

Accordingly, since the pan frame 20 and the first occupant support member 41 are disposed to be easily continuous to each other, the sitting feeling may be further improved.

Further, the attachment space for attaching the first occupant support member 41 to the side frame 11 may be sufficiently ensured.

As shown in FIG. 2, the corrugated pitch of the first occupant support member 41 is formed to be larger than the corrugated pitch of the second occupant support member 42. Further, the diameter of the first occupant support member 41 is formed to be larger than the diameter of the second occupant support member 42.

That is, the first occupant support member 41 is formed so that the bending amount in the up and down direction with respect to the load generated when the occupant sits on the seat becomes smaller than that of the second occupant support member 42.

For that reason, the first occupant support member having a small bending amount is disposed at the substantial center portion of the cushion frame 10 to which a small load is applied among the sitting load generated by the buttocks of the occupant when the occupant sits on the seat. Then, the second occupant support member having a large bending amount is disposed at the rear portion of the cushion frame 10 to which a large load is applied.

Accordingly, when the corrugated pitches or the diameters of the first occupant support member 41 and the second occupant support member 42 are appropriately changed, it is possible to further improve the sitting feeling while having a high followability with respect to the occupant sitting on the seat.

As shown in FIG. 5, the occupant support member 40 is formed so that the ischial tuberosities of the occupant sitting on the seat are disposed between the first occupant support member 41 and the second occupant support member 42. That is, the first occupant support member 41 and the second occupant support member 42 are disposed while being separated from each other so as not to be disposed right below at least the ischial tuberosities.

For that reason, it is possible to obtain a satisfactory sitting feeling by reducing an ischial pressure applied to the ischial tuberosities of the occupant sitting on the seat.

Figure 6:
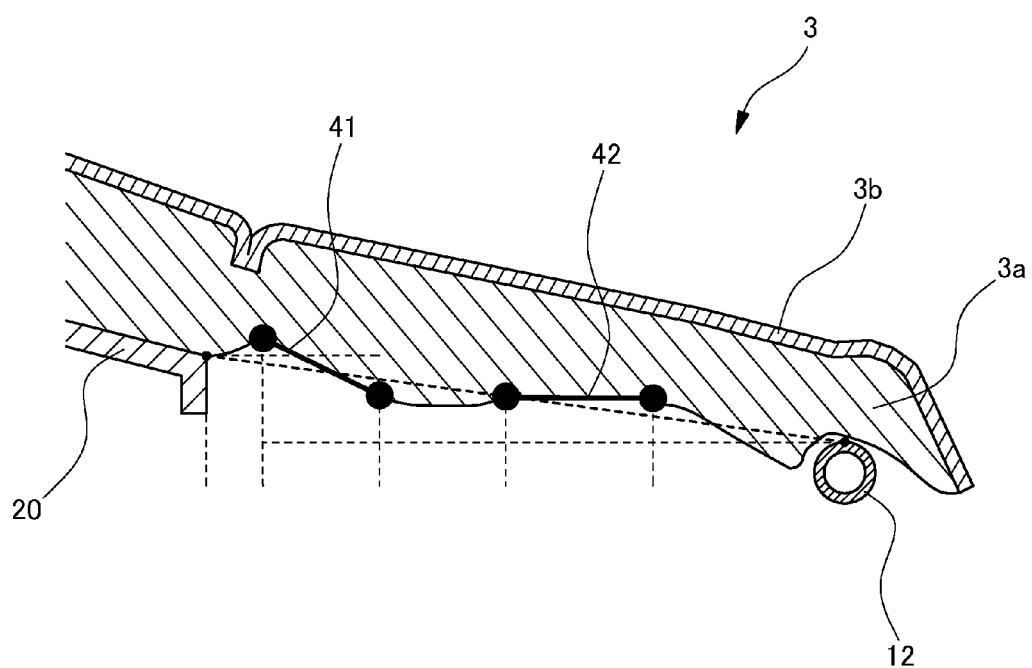
FIG. 6 is a diagram illustrating a configuration in which an occupant support member according to the embodiments is disposed.

Next, as shown in FIG. 6, the distance between the front end of the first occupant support member 41 and the rear end of the pan frame 20 in the front to back direction becomes smaller than the distance of the first occupant support member 41 in the front to back direction.

Further, the distance between the front end of the first occupant support member 41 and the rear end of the pan frame 20 in the front to back direction becomes smaller than the distance between the rear end of the first occupant support member 41 and the front end of the second occupant support member 42 in the front to back direction.

For that reason, since a stress of a sitting load is distributed to the pan frame 20 and the occupant support member 40 while the stress is not intensively applied to the occupant support member 40 when the occupant sits on the seat, the sitting feeling may be further improved.

Next, as shown in FIG. 6, the first occupant support member 41 is disposed to be inclined downward with respect to the horizontal plane from the pan frame 20 toward the frame connection member 12.

Further, the second occupant support member 42 is disposed on the horizontal plane or is disposed to be inclined upward from the pan frame 20 toward the frame connection member 12.

For that reason, since the occupant support member 40 may easily follow the body shape of the buttocks of the occupant, a satisfactory fitting feeling of the occupant sitting on the seat may be obtained.

Furthermore, the inclination angle of the first occupant support member 41 and the inclination angle of the second occupant support member 42 are set depending on the body shape of the buttocks of the occupant having a standard body shape, and the first occupant support member 41 is formed so that the inclination angle with respect to the horizontal plane becomes larger than that of the second occupant support member 42.

Next, as shown in FIG. 6, the front end of the first occupant support member 41 is disposed at the upper position than the rear end of the pan frame 20.

That is, the pan frame 20 and the first occupant support member 41 are substantially disposed in a plane shape when the occupant sits on the seat in consideration of the bending amounts of the cushion pad 3a and the first occupant support member 41 in the up and down direction with respect to the load generated when the occupant sits on the seat.

For that reason, since the followability with respect to the occupant sitting on the seat is high, the sitting feeling may be further improved.

Further, since the first occupant support member 41 is inclined backward so that the front end thereof is located at the upper position than the rear end of the pan frame 20, the rear end of the pan frame 20 may easily extend toward the first occupant support member 41. Accordingly, since the pan frame 20 and the first occupant support member 41 are disposed to be easily continuous to each other, the sitting feeling may be further improved.

Next, as shown in FIG. 6, the first occupant support member 41 and the second occupant support member 42 are disposed higher at the upper position than the upper surface of the frame connection member 12.

Further, the front end of the first occupant support member 41 and the rear end of the second occupant support member 42 are respectively disposed above the plane formed by the rear end of the pan frame and the upper surface of the frame connection member.

For that reason, the occupant support member 40 is disposed near the buttocks of the occupant sitting on the seat in the up and down direction, and hence the followability with respect to the occupant with the cushion pad 3a interposed therebetween may be further improved. Further, since the thickness of the cushion pad 3a is thinned, the seat may be decreased in weight and size.

The occupant support member 40 of the embodiment extends in the right and left direction to substantially form a plane with respect to the surface contacting the cushion pad 3a, but may be appropriately modified.

As the other embodiment, the center portion of the occupant support member 40 in the right and left direction may be provided with a bent portion which is bent opposite to the cushion pad 3a in a direction perpendicular to the surface contacting the cushion pad 3a.

Since the center portion of the occupant support member 40 is located at a position corresponding to the concave portion 30 of the pan frame 20, it is possible to further reduce the impact applied to the groin of the occupant by the bent portion of the concave portion 30 and the occupant support member 40 when the occupant sits on the seat. Accordingly, it is possible to further improve the sitting feeling of the occupant.

Furthermore, in the above-described embodiments, the front seat of the automobile has been described as a specific example, but the invention is not limited thereto. For example, the invention may be, of course, also applied to the middle seat and the rear seat of the automobile.

REFERENCE NUMERALS

S vehicle seat
1 seat back
1a, 2a, 3a cushion pad
1b, 2b, 3b outermost cover
2 headrest
3 seat cushion
10 cushion frame
11 side frame
12 frame connection member
20 pan frame
21 both right and left ends
22 bent portion
23 side flange portion
24 rear flange portion
25 convex portion
26 inclined portion
27 thigh support portion
30 concave portion
31 inclined portion
32 bottom surface portion
33 hole
34 hole portion
35 connection portion
40 occupant support member
41 first occupant support member
42 second occupant support member

The invention claimed is:

1. A vehicle seat comprising:
a seat cushion which includes a cushion frame as a framework,
wherein:
the cushion frame comprises:
right and left side frames;
a pan frame connecting front portions of the side frames to each other; and
a first occupant support member and a second occupant support member, each of which connects the side frames at a rear side of the pan frame;
the first occupant support member is disposed to be inclined backward with respect to a horizontal plane;
a front end of the first occupant support member is provided at a higher position than a rear end of the pan frame;
a center portion of the pan frame in a right and left direction is provided with thigh support portions supporting thighs of an occupant sitting on the seat;
the thigh support portions extend toward the first occupant support member more than both right and left ends of the pan frame in a front to back direction;
the first occupant support member is disposed near the pan frame in the front to back direction;
the second occupant support member is disposed behind the first occupant support member and at a lower position than an upper end of the first occupant support member in a horizontal direction.

2. The vehicle seat according to claim 1, wherein:
the first occupant support member and the second occupant support member are formed in a corrugated shape to be curved at a predetermined pitch in the front to back direction; and
the pitch of the first occupant support member is larger than that of the second occupant support member.

3. The vehicle seat according to claim 1, wherein:
the first occupant support member and the second occupant support member are formed as an elastic spring; and
the diameter of the first occupant support member is larger than the diameter of the second occupant support member.

4. The vehicle seat according to claim 1, wherein in the thigh support portions, the rear end extending toward the first occupant support member is provided with a flange protruding downward from the rear end.

5. The vehicle seat according to claim 1, wherein a concave portion which is recessed downward is formed between the thigh support portions in the right and left direction.

6. The vehicle seat according to claim 1, wherein:
the cushion frame includes a frame connection member that connects the rear portions of the right and left side frames; and
the first occupant support member and the second occupant support member are provided at a higher position than the upper surface of the frame connection member.

7. The vehicle seat according to claim 6, wherein the front end of the first occupant support member and the rear end of the second occupant support member are provided at a higher position than a plane formed by the rear end of the pan frame and the upper surface of the frame connection member.

* * * * *